July 27, 1926.

H. E. BRIAIS

COMBINED CLUTCH AND TRANSMISSION MECHANISM

Filed July 14, 1924 5 Sheets-Sheet 2

Henry E. Briais
INVENTOR

BY Victor J. Evans
ATTORNEY

WITNESS:

July 27, 1926.

H. E. BRIAIS 1,594,239

COMBINED CLUTCH AND TRANSMISSION MECHANISM

Filed July 14, 1924    5 Sheets-Sheet 3

Henry E. Briais
INVENTOR

BY Victor J. Evans
ATTORNEY

July 27, 1926.

H. E. BRIAIS

COMBINED CLUTCH AND TRANSMISSION MECHANISM

Filed July 14, 1924    5 Sheets-Sheet 4

Henry E. Briais
INVENTOR

BY Victor J. Evans
ATTORNEY

July 27, 1926.

H. E. BRIAIS

COMBINED CLUTCH AND TRANSMISSION MECHANISM

Filed July 14, 1924  5 Sheets-Sheet 5

1,594,239

Henry E. Briais,
INVENTOR

BY Victor J. Evans
ATTORNEY

Patented July 27, 1926.

1,594,239

UNITED STATES PATENT OFFICE.

HENRY E. BRIAIS, NOW BY JUDICIAL CHANGE OF NAME HENRY E. BRICE, OF NEW YORK, N. Y.

COMBINED CLUTCH AND TRANSMISSION MECHANISM.

Application filed July 14, 1924. Serial No. 725,993.

This invention relates to a combined clutch and transmission mechanism for motor operated vehicles.

The principal object of the invention is to provide an automobile clutch which, instead of being able to revolve a single shaft, the same will be capable of revolving any one of a number of shafts which may be selected by the operator, so that the gears operated by these shafts may be always in mesh, and the selection of a set of gears may be made by the selection of the particular shaft which it is desired that the clutch shall turn.

Another object in attaining the one just mentioned, is to perform the same in such a manner that the operator shall have as many different gear ratios at his disposal as is usually considered advantageous for a car, instead of being limited to two speeds such as the principal planetary system of the present day.

A further object of the invention is to provide a means for the selection of any gear ratio or shaft adapted to be made by the easy movement of a speed lever such as is now used on the slidable gear system complying with the standard shift now used by most automobile manufacturers.

A still further object is to provide a device capable of separating its direct drive shaft from rotative connection with the transmission gears if so desired, whenever the direct drive is being used, so that when the car is "in high" all gears shall be at rest, as if the car had been made with that one speed alone.

A still further object is to provide a set of transmission gears which may be used in combination with a clutch, whereby the tendency which gears possess to force each other apart when in mesh, shall have no effect on the bearings so that the device will be no more affected by the tendency than if it did not exist.

With these and other objects in view, the invention resides in certain novel construction and combination and arrangement of parts, the essential features of which are hereinafter fully described, are particularly pointed out in the appended claims, and are illustrated in the accompanying drawing, in which:—

The advantages of my invention consist mainly in the elimination of the defects of the sliding gear system among which defects are the following:—the clashing of parts, with the resulting wear and noise; the occasional refusal of the gears to mesh when approaching without repeated operation of the clutch, the refusal of the gears to mesh when changing speeds if the car is travelling too fast or too slow for that particular change. The necessity of many cars in passing from one speed to another, of coming almost to a stop to make it possible, thereby producing a strain when the clutch is let in again, and the impossibility of throwing the car into lower and lower speeds when the brakes fail to work (and it is desired to use the motor as a brake) because the gears will not enter in mesh when the car is travelling at a high rate of speed.

In order to simplify my invention, so that it may be more easily understood, an attempt has been made to represent only those details which are necessary to show the principles, leaving out many others such as lubrication, ball and roller bearings, etc., which belong more to the manufacturer so long as the principles are not dependant on them.

Referring more particularly to the drawings, and particularly to Figures 1 to 9 inclusive, the reference character A designates a crank or power shaft of an internal combustion engine, and B the drive shaft which is adapted to be driven by the power shaft for imparting movement to the driven wheels of an automobile. Interposed between the power shaft A and the drive shaft B, is a selective clutch mechanism C, a transmission mechanism D and a secondary clutch mechanism or gear disengaging mechanism E, all of said mechanisms co-acting to operate the drive shaft at variable speeds or in opposite direction.

Throughout the drawing, the reference numerals 1, 2, 3 and 4 designate tubular shafts, which are of different lengths and are of a common axis and capable of revolving independently of each other. The shafts 1, 2 and 3 are grooved at each end as at 5 and 6 to enable them to be keyed to other parts about to be described. Disks 7, 7ª and 7ᵇ are keyed to the grooved ends 6 of the shafts 1, 2 and 3 respectively. Each of these disks is interposed between two friction disks 8 which may be constructed of asbestos, cork, leather or other friction producing material. The disks 8 are adapted to be clamped between two other surfaces in the nature of an end plate 9, and disks or walls 10 by a means presently to be described. It will be seen that if the parts 9 and 10 are pressed together, they will clutch the disk 7 and force the shaft 1 to which it is keyed to turn with them when rotary movement is imparted to the parts 9 and 10.

The shaft 4 instead of being keyed to a disk similar to shafts 1, 2 and 3, terminates itself in a disk 11. Extending through the shaft 4 is a rod or sliding shaft 12 which is formed adjacent one end with a disk 13. The disks 11 and 13 are adapted to be pressed together and revolved when clutched between the outer sides of disks 8' similar to the friction disks 8. When they are thus pressed together, the rod 12 will slide toward the left within the shaft 4. It might be mentioned that the disks numbered 14 perform the same work for the shafts 2, 3 and 4 as the end plate 9 does for the shaft 1.

Reviewing what has been so far described, it will be understood that there has been provided four tubular shafts, any one of which may be revolved by a set of disks, according to which one of these sets is gripped by the clutch, and the gripping of the shaft 4 will also slide the rod 12 toward the left for a purpose to be described. Referring to the parts which carry the driving disks 9, 10 and 14, I provide a cylinder 15 having an end plate 16 bolted thereto as at 17, and which end plate is in turn bolted as at 18 to the power shaft A. By mounting the cylinder 15 at the end of the crank shaft, it is possible to dispense with the usual fly wheel as the weight of this cylinder is capable of performing the same function. The other end of the cylinder 15 is bolted as at 20 to an end plate 21, and which end plate is formed with an opening 22 and revolves freely on an extension 23 formed on the end plate 89 of the transmission casing, and which casing is stationarily mounted to the chassis frame of the automobile as will be described hereinafter.

Mounted within the cylinder 15 is an inner cylinder 25 which has bolted thereto as at 26, an end plate 27. The end plate 27 is mounted for sliding movement on a stub shaft 28 which is held to the end plate 16 by means of the bolts 18 previously mentioned. The end plate 9 previously mentioned is bolted to the other end of the cylinder 25 as at 29 and the said plate 9 is mounted for sliding movement on a hub 30 extending from the end plate 21 of the outer cylinder. The cylinder 25 is thus able to slide a short distance to the right or left within the cylinder 15 and is adapted to revolve therewith by means presently to be described, and if desired additional means may be provided by making the end plates 9 and 27 keyed to the hub 30 and stub shaft 28 respectively, instead of having these parts perfectly cylindrical as shown in the drawing.

Figures 9, 10, 11, 12, 13, 14:
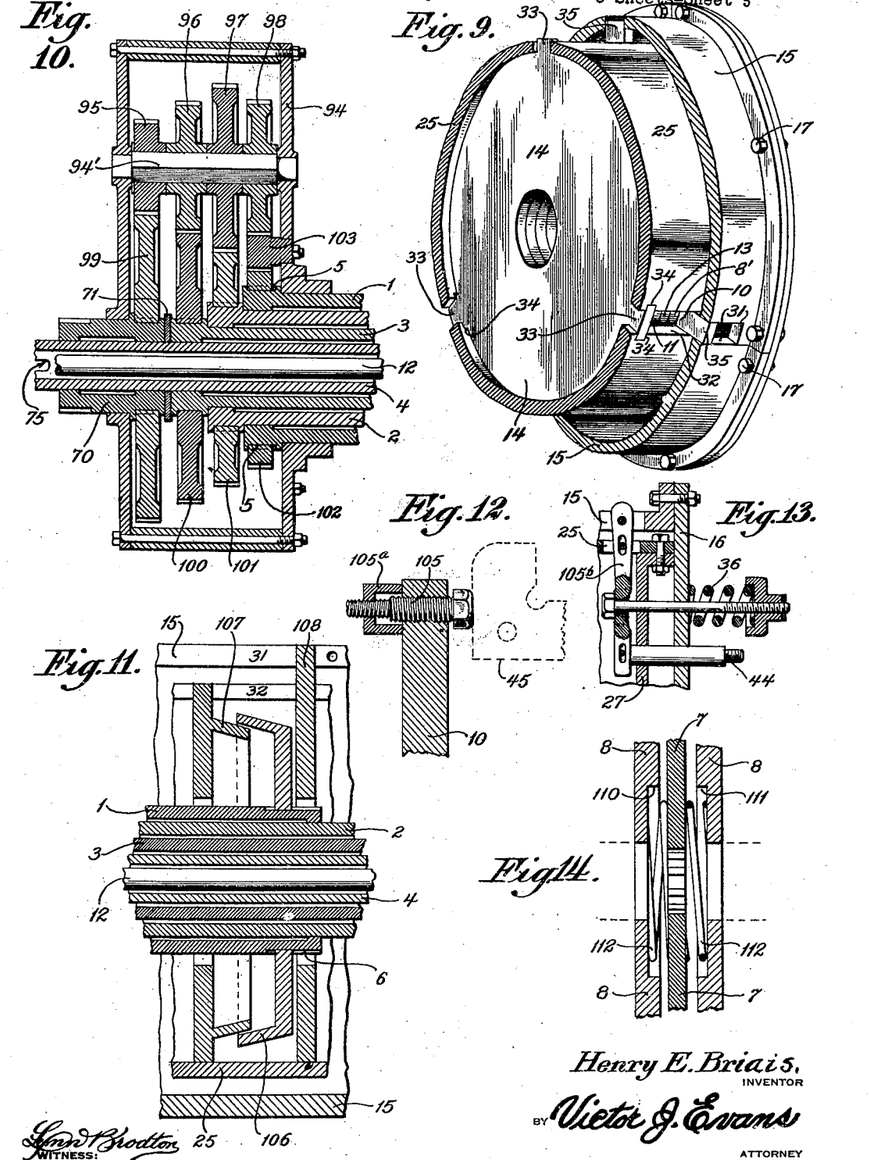
Figure 9 is a sectional perspective view of the selective clutch mechanism.
Figure 10 is a sectional view of a modified form of transmission.
Figure 11 is a sectional view of a modified form of clutch.
Figure 12 is a detail view of a wear compensator which may be used in connection with the disk shifting mechanism.
Figure 13 is a modified form of clutch operating mechanism.
Figure 14 is a modified form showing a spacing means for the co-acting disks.

The construction of both cylinders will be best understood by reference to Figure 9 of the drawing where it will be seen that each cylinder consists of three sections bolted to the end plates and that between every two sections there is provided a slot or guide-way 31 for the outer cylinder, and a slot or guideway 32 for the inner cylinder. Each disk 14 is shown as having three lugs or projections 33, each projection being imbedded in a pair of recesses 34 formed in the side walls of the slots 32. The three disks 14 shown in Figure 1 of the drawing are thus held by the inner cylinder 25, and the end plate 9 being bolted to the same cylinder, thus provides the cylinder with four flat stationary walls 9, 14, 14, and 14 which therefore must move with the cylinder as if cast with it.

The disks 10 are not fastened in the manner of the disks 14 but are each provided with three radial studs or projections 35 which extend through the guide ways 31 and 32 of the cylinders, and are free to slide either to the right or left in the guide ways as the occasion may require. The four slidable disks 10 are controlled by means on the outer cylinder, while the four walls previously mentioned are secured to the inner cylinder. The projections 35 force both cylinders to revolve together.

When the clutch pedal to be presently described is up, the inner cylinder is kept tightly pressed to the right against the end plate 16 of the outer cylinder by means of a plurality of tension springs 36 which exert a pulling force on the bolts 37 carried by the end wall 27 of the inner cylinder and extending through the end plate 16 of the outer cylinder.

For sliding the inner cylinder within the outer cylinder, there is provided a clutch pedal 38, which when pushed down turns a shaft 39 which operates a fork 40 which compresses a collar 41 to which it is connected by means of studs 42. The direction of the pressure on the collar 41 is toward the back of the car or to the left in Figure 1, and it will be seen from Figure 1 that the pressure will bear on a block 43 sliding to the left and pushing upon bolts 44 which connect the block 43 with the end plate 27 of the inner cylinder whereby the final result of depressing the clutch pedal 38 will be the sliding to the left of the inner cylinder for overcoming the strength of tension of the springs 36.

Figure 1:
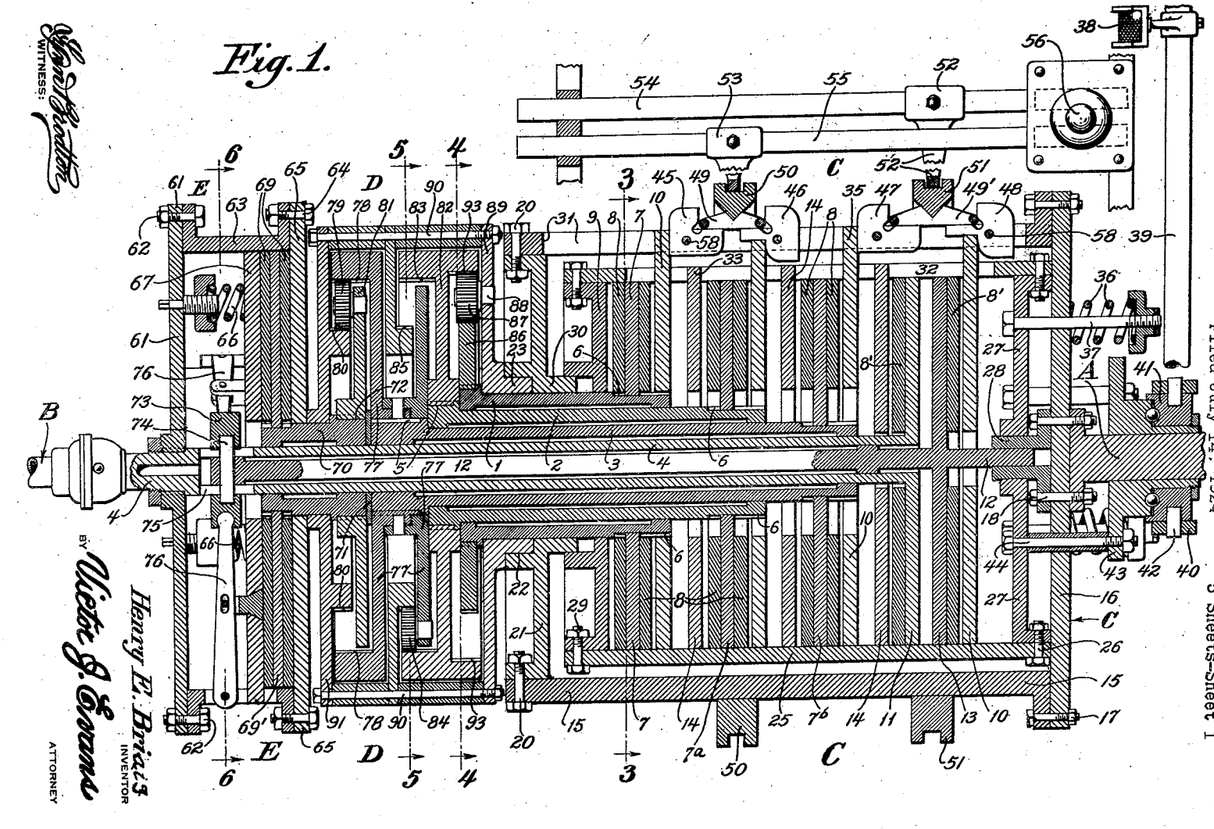
Figure 1 is a horizontal sectional view of my invention.
Figures 2, 7, 8:
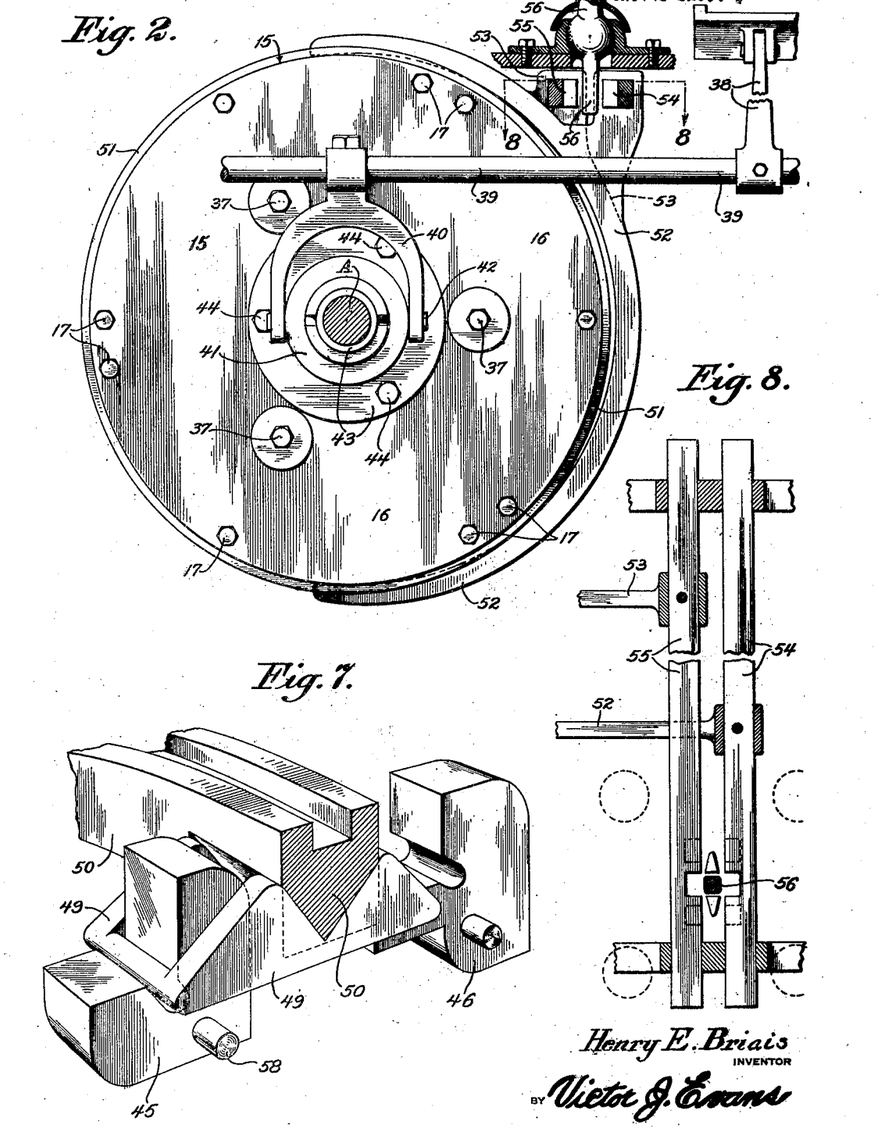
Figure 2 is a front elevation with parts in section.
Figure 7 is a detail perspective view of the disk shifting mechanism.
Figure 8 is a sectional plan view of the speed changing mechanism.
Figures 3, 4:
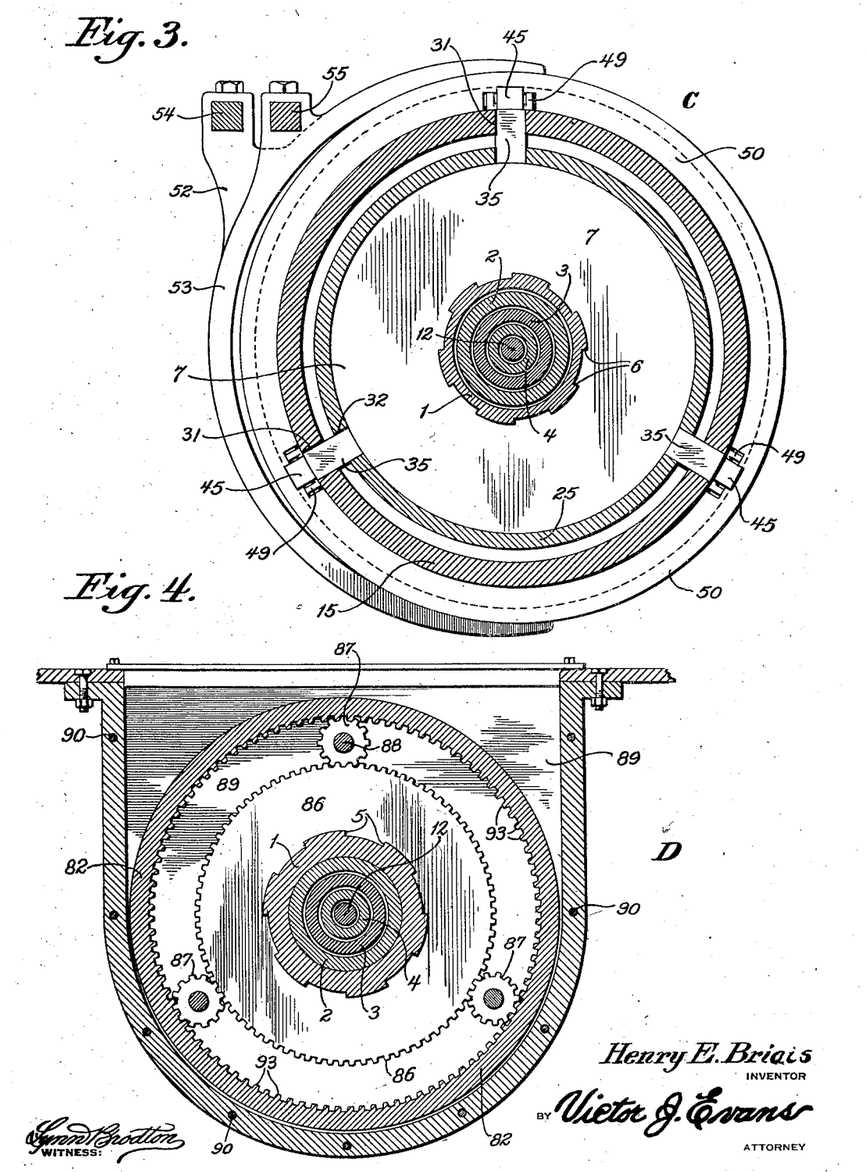
Figure 3 is a transverse sectional view on the line 3—3 of Figure 1.
Figure 4 is a similar view on the line 4—4 of Figure 1.
Figure 5:
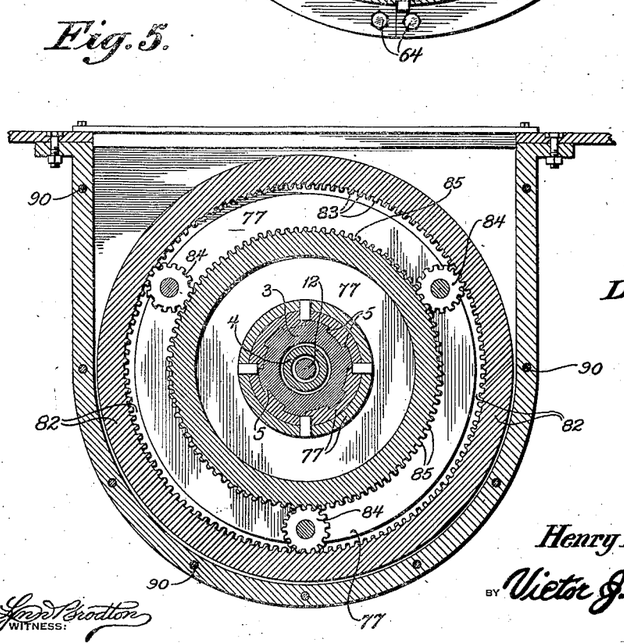
Figure 5 is a similar view on the line 5—5 of Figure 1.
Figure 6:
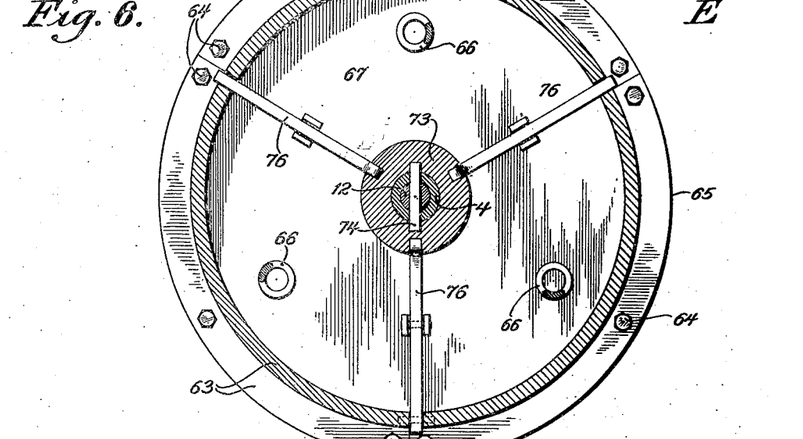
Figure 6 is a similar view on the line 6—6 of Figure 1.

When the clutch is "in" however, as shown in Figure 1, none of the driven disks will be gripped because the inner cylinder is in a position to the right as far as it can go, and none of the disks 10 are sufficiently far to the left for anything to be grasped between them and the disks 14 or the end plate 9.

The manner in which the driven disks are clutched consists in throwing the clutch "out", thus pushing the inner cylinder to the left with its four walls 9, 14, 14, and 14, then moving one of the disks 10 in a manner to be described, which pushes the disk to the left where it is held, then letting the clutch "in" again so the inner cylinder in returning to the right, co-acts or catches a driven disk between one of its flat walls and the disk 10 which was pushed toward the left. This means for moving the disk 10 toward the left will now be described.

Mounted within each of the three slots or guide ways 31 are four cams 45, 46, 47 and 48. These cams are operated by a pair of controlling devices disposed over each guideway and which devices are designated by the numerals 49 and 49'. The controlling devices 49 and 49' are moved by rings 50 and 51 respectively which are adapted to slide to the right or left by means of two forks 52 and 53 respectively which are connected to two rods 54 and 55 respectively. These rods may be moved toward the front or back of the car by the operation of a speed lever 56 which lever and rods are moved on the same principle as that of the slidable gear type of cars, the speed lever being able to move in the usual figure "H" positions. These positions are clearly illustrated in Figure 1 of the drawing. When the speed lever is in the position shown in Figure 1, the same is in neutral, that is, the two cylinders 15 and 25 are revolving with the crank shaft, and all driven disks, shafts and whatever gears they operate, are idle.

When the rod 55 is moved back by the operation of the lever 56, the part 49 pushes against the cam 45 and turns the same to the left a quarter revolution. The position will then be the same as that shown in Figure 7 of the drawing. It will be seen that from the shape of the cam, which is pivoted in the walls of the guideway as at 58, that the movement of the same will force the disk 10 a greater distance to the left than that which it occupies in Figure 1 of the drawing. The act of letting in the clutch will then grasp the driven disk 7 between this disk 10 and the end plate 9 and the shaft 1 will be revolved with the cylinders. When the rod 55 is brought forward again it will first bring the cam 45 back to a neutral postion, then if a forward motion continues the part 49 will operate the cam 46 and turn it in a position as will be readily understood. The clutch will then be connected with the shaft 2. The rod 54 is adapted to be operated in a similar manner for operating the cams 47 and 48 to clutch the shafts 3 and 4 as desired.

With reference to Figure 1 of the drawing, it will be seen that the secondary clutch or gear disengaging mechanism is arranged to the left of the selective clutch mechanism and comprises a plate 61, keyed to the shaft 4, and said plate is bolted as at 62 to a cylinder 63, which in turn has bolted thereon at 64, an end plate 65. Clutch springs 66 press against the disk 67, and between the disk 67 and the end plate 65 are two friction disks 69 between which is interposed a driven disk 69'. The disk 69' is keyed to a short shaft 70 which surrounds the shaft 4 and which is separated from the shaft 3 by a washer 71. The right end of this short shaft 70 is grooved as at 72 to enable certain other parts to be keyed thereto as will appear.

When the car is in neutral, or when any set of disks is clutched except that of the shaft 4, the shaft 70 is held fast with the shaft 4 as if it were a part of it. When the disks of the shaft 4 are clutched however, the sliding to the left of the rod 12 has the effect of releasing this secondary clutch and rendering the shaft 4 free from any rotative connection with the shaft 70. The rod 12 operates a ring 73 which is connected to the rod 12 by a pin 74 which is slidable in a slot 75 in the shaft 4. The ring 73 is adapted to move to the left and in turn operates three radially disposed levers 76 which are adapted to pull the disk 67 toward the left against the tension of the springs 66 to disconnect the secondary clutch mechanism. It may be asked how the springs 36 of the main clutch can have sufficient strength to operate the main clutch and overcome the strength of the springs 66 in the secondary clutch. In answer to this, it will be noted that the relative strength of the two sets of springs is a matter of choice and even if they have the same strength, the result may be accomplished as the springs 36 act on the springs 66 through the medium of the levers 76 previously described.

It has been previously mentioned that the ends of the shafts 1, 2 and 3 were provided with keyed surfaces 5. It is, of course, understood to one skilled in the art that any one of a number of different combinations of gears may be inserted between the selective clutch mechanism and the gear disengaging mechanism so that the shafts 1, 2 and 3 may act in different ways upon the shaft 70. In the preferred form I have shown a transmission mechanism D but it will be understood that the mechanism such as shown in Figure 10 of the drawing may be substituted therefor if desired.

It might here be stated that I have provided my invention with only four speeds, three of which are forward and the other reverse. There are two reasons for constructing the invention in this manner, first, the principles can be clearly illustrated and simplified by giving only three speeds forward; second, almost all manufacturers of high class cars have abandoned the four speeds forward as a useless encumbrance to the driver. If a four speed forward arrangement should be desired it is only a matter of adding another tubular shaft with its necessary accessories.

With reference to the transmission mechanism D shown in the preferred form, it will be apparent that rotation of the shaft 3 upon which is keyed a part 77 will cause the rotation of an internal gear 78. This internal gear acts on three planet gears 79 and rolls them over a fixed sun gear 80 which is formed on an end plate 91 of the transmission housing. The plate 81 is keyed to the short shaft 70 and rotatably supports the planet gears 79 and this plate rotates the short shaft 70 at a slower speed than the shaft 3 and the car will be running in second speed (third speed being the direct drive or high).

When shaft 2 is rotated through the friction clutch mechanism, the part 82 which is keyed to the shaft 2 revolves with an internal gear 83. This internal gear acts on three planet gears 84 and rolls them on the fixed sun gear 85. It will be noted that the planet gears 84 are pinioned to the part 77, which part is keyed to the shaft 3. The shaft 3 will thus be forced to turn at a slower pace than the shaft 2 and as shaft 70 is turned by the shaft 3, the shaft 70 must therefore turn at a still lower rate, the final reduction being obtained by multiplying the reduction at the part 77 by the reduction at the part 81. The car will then be in first speed. When the shaft 1 is revolved through the selective clutch mechanism, the same revolves a gear 86 which is keyed to the end of said shaft. This gear revolves three pinions 87 which are rotatably mounted as at 88 to the end plate 89 of the transmission housing and which end plate has been previously mentioned. The plates 89 and 91 together with the intermediate parts are secured together by bolts 90 and fastened to the chassis frame in any suitable manner. The pinions 87 will turn the internal gear 93 formed on the part 82 in reverse direction at a slower pace than the shaft 1 has in its forward direction. The internal gear 93 is but a part of the part 82, and the shafts 2, 3 and 70 will revolve at a slower and slower reverse speed. The final reduction will be equal to the reduction at 93 multiplied by the product of the reductions at 77 and 81. It will therefore be seen that when the shaft 1 is driven, the drive shaft B will be turning in a reverse direction.

While the ratios used and the transmission gearing may be varied, the following may be found satisfactory:

If the internal gears 78 and 83 have each 84 teeth, the internal gear 93 has 89 teeth, the planets 79 and 84 each 17 teeth, the pinions 87 each 16 teeth, the fixed sun gears 80 and 85 each 50 teeth and the revolving gear 86 has 57 teeth, the final reductions will be as follows:—Reverse, 3.97 to 1; first speed, 2.54 to 1; second speed, 1.59 to 1; third speed or high 1 to 1. These ratios are the average for the cars having three speeds forward. It will be understood that the usual tendency of the gears to force each other apart when revolving has no effect here, for the internal, sun and planet gears merely resist each other. The planet gears simply play the part of large roller bearings provided with teeth to prevent slipping.

In Figure 10 of the drawing, I have shown a modified form of transmission gears and in which the numeral 94 designates a housing in which is mounted for rotation a square shaft 94', on which are keyed four gears 95, 96, 97 and 98. The gear 95 transmits power to a gear 99 keyed to the short shaft 70 while the gears 96 and 97 transmit the power from the gears 100 and 101 which are keyed to the shafts 3 and 2 respectively. The gear 98 receives the reverse motion from an idler gear 103 which is turned by a gear 102 keyed to the shaft 1. Although the gears in this form have been shown as formed of a single piece, it will be understood that the gears may be of two halves bolted or riveted together to provide teeth of V-shape. This is also true of my preferred form.

In Figure 11 there is shown a modified form wherein the disk form of clutch may be dispensed with, and in which the numeral 106 designates a driven cone which may be substituted for the driven disk 7 in the preferred form. 107 designates a driving cone which is the equivalent of the driving disk 14 in the preferred form and 108 is a plate which is the equivalent to the disk 10. In operation, the driving cone 107 co-acts with the driven cone 106 for imparting movement to the respective shafts. In Figure 12 there is shown one way of adjusting the disks 10 to compensate for the thinning of the disks which might result from wear. In this form, instead of the cam 45 pressing directly against the disk 10, the same presses against the head of a bolt 105 which may be adjusted upon the disk as the wear occurs. A lock nut 105$^A$ is screwed to the free end of the bolt to lock the bolt in its adjusted position. In Figure 13, there is shown a modified form wherein the main springs 36 act on the inner cylinder 25 through leverage of their own in which their strength is intensified by a lever 105$^D$. This form may be substituted for that shown in the preferred form, for the direct drive, the driver may have to depress the clutch pedal twice as far as for the other speeds, so that the springs may expand energy of twice as long return movement.

In Figure 14 there is shown the disks 8 as provided with recesses 110 and 111 and which recesses serve as a seat for springs 112 which springs act against opposite faces of the driven disks 7 so as to hold the disks 10 and 14 in yielding relation to the driving disks. These springs must not exert pressure, but merely fill the space.

From the foregoing description, it will be seen that my invention is not dependent on whether each shaft has one driven disk or several, nor whether they are flat or corrugated or otherwise formed, nor even on the use of the disks at all. It is not dependent on the means shown for pressing the parts against each other, for many different springs could be used and many different kinds of levers for them to act on. It is not dependent upon the means of control which I have shown nor is it dependent on the secondary clutch, for the elimination of this clutch would mean the elimination of the work done by it, giving to the shaft 4 the keyed surface 72 of the shaft 70 which would be done away with. However, the invention is dependent on the tubular shafts which have a common axis and which engage one common clutch. It is dependent on having tubular shafts surround a center shaft which must be used for the direct drive and which may or may not be tubular itself. The shaft 4 does not need to be tubular if the secondary clutch mechanism is dispensed with. It is dependent on having all shafts except the center one carry their power to gears which are always in mesh. It is further dependent on having the middle shaft receive the same power coming from any one of these shafts through these constantly meshing gears, according to the choice of the driver, or on having this same middle shaft grasped and revolved directly by the clutch. Of course, if the middle shaft is made of two pieces, such as 4 and 70, the two are equivalent to one.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In a combined clutch and transmission, the combination of the power shaft of a motor, of a driven shaft, a plurality of shafts having a common axis, a cylinder, a second cylinder within said first cylinder, both of said cylinders being rotatable with said power shaft, a friction disk keyed to one end of each of said shafts, co-acting sets of friction plates within said second cylinder and rotatable therewith for co-action with said friction disks, speed changing gears operable by the other end of each of said shafts, and controlling means for selectively rotating said disks.

2. In a combined clutch and transmission, the combination of the power shaft of a motor, of a driven shaft, a plurality of shafts having a common axis, a cylinder, a second cylinder within said first cylinder, both of said cylinders being rotatable with said power shaft, a friction disk keyed to one end of each of said shafts, co-acting sets of friction plates within said second cylinder and rotatable therewith for co-action with said friction disks, speed changing gears operable by the other end of each of said shafts, controlling means for selectively rotating said disks, and means operable by one of the shafts for rendering the speed changing gears idle to permit motion to be imparted direct from said power shaft to said driven shaft.

3. In a combined clutch and transmission, the combination of the power shaft of a motor, of a driven shaft, a plurality of shafts having a common axis, a cylinder, a second cylinder within said first cylinder, both of said cylinders being rotatable with said power shaft, a friction disk keyed to one end of each of said shafts, co-acting sets of friction plates within said second cylinder and rotatable therewith for co-action with said friction disks, speed changing gears operable by the other end of each of said shafts, means for sliding said second cylinder within said first cylinder to move said friction plates into engagement with said friction disk, and controlling means for selectively operating one of the plates of each set.

4. In combination with the power shaft of a motor, a driven shaft, a plurality of shafts having a common axis, an outer cylinder rotatable with said power shaft, an inner cylinder slidable within said outer cylinder, walls formed in said inner cylinder, plates spaced from said walls and slidable with respect to the same, a friction disk keyed to one end of each of said shafts and interposed between one of said walls and one of said plates, manually operable means for sliding the inner cylinder in one direction, automatic means for moving said cylinder in an opposite direction, and controlling means for selectively sliding said plates for causing the respective walls and plates to co-act with said friction disks.

5. In combination with the power shaft of a motor, a driven shaft, a plurality of shafts having a common axis, an outer cylinder rotatable with said power shaft, an inner cylinder slidable within said outer cylinder, walls formed in said inner cylinder, plates spaced from said walls and slidable with respect to the same, a friction disk keyed to one end of each of said shafts and interposed between one of said walls and one of said plates, manually operable means for sliding the inner cylinder in one direction, automatic means for moving said cylinder in an opposite direction, controlling means for selectively sliding said plates for causing the respective walls and plates to co-act with said friction disks, and speed changing gears operable by the other ends of said shafts for imparting variable rotation to said driven shafts.

6. In combination with the power shaft of a motor, a driven shaft, a plurality of shafts having a common axis, an outer cylinder rotatable with said power shaft, an inner cylinder slidable within said outer cylinder, walls formed in said inner cylinder, plates spaced from said walls and slidable with respect to the same, a friction disk keyed to one end of each of said shafts and interposed between one of said walls and one of said plates, manually operable means for sliding the inner cylinder in one direction, automatic means for moving said cylinder in an opposite direction, and controlling means for selectively sliding said plates for causing the respective walls and plates to co-act with said friction disks, speed changing gears operable by the other ends of said shafts for imparting variable rotation to said driven shafts, and means operable by one of said shafts for rendering the speed changing gears idle to impart motion from said power shaft direct to said driven shaft.

In testimony whereof I have affixed my signature.

HENRY E. BRIAIS.